(12) United States Patent
Li et al.

(10) Patent No.: US 10,772,479 B2
(45) Date of Patent: Sep. 15, 2020

(54) FABRIC PRODUCTION METHOD AND THE FABRIC

(71) Applicant: Suying Li, Dongguan, Guangdong (CN)

(72) Inventors: Suying Li, Guangdong (CN); Weiming Lv, V, Guangdong (CN); Weiyao Lv, Guangdong (CN); Guangda Li, Guangdong (CN); Meili Wang, Guangdong (CN)

(73) Assignee: Suying Li, Dongguan (CN)

( * ) Notice: Subject to any disclaimer, the term of this patent is extended or adjusted under 35 U.S.C. 154(b) by 0 days.

(21) Appl. No.: 16/438,397

(22) Filed: Jun. 11, 2019

(65) Prior Publication Data

US 2019/0290093 A1    Sep. 26, 2019

Related U.S. Application Data

(63) Continuation of application No. PCT/CN2017/103967, filed on Sep. 28, 2017.

(30) Foreign Application Priority Data

Nov. 3, 2016    (CN) .......................... 2016 1 0957122

(51) Int. Cl.
    *B32B 37/00*    (2006.01)
    *A47L 13/16*    (2006.01)
    (Continued)

(52) U.S. Cl.
    CPC .............. *A47L 13/16* (2013.01); *B08B 1/006* (2013.01); *B32B 5/022* (2013.01); *B32B 5/06* (2013.01);
    (Continued)

(58) Field of Classification Search
    USPC ......................................................... 156/73.1
    See application file for complete search history.

(56) References Cited

U.S. PATENT DOCUMENTS

| | | | |
|---|---|---|---|
| 8,178,199 B2 * | 5/2012 | Gupta | .................. D01D 5/0985 428/359 |
| 9,185,947 B2 * | 11/2015 | Spencer | .................... A43B 1/12 |
| 9,943,135 B2 * | 4/2018 | Baychar | ..................... B32B 3/26 |

FOREIGN PATENT DOCUMENTS

| | | |
|---|---|---|
| CN | 103422338 A | 12/2013 |
| CN | 203346727 A | 12/2013 |
| CN | 109016725 A | 12/2018 |

* cited by examiner

*Primary Examiner* — James D Sells
(74) *Attorney, Agent, or Firm* — Wayne & Ken, LLC; Tony Hom

(57) ABSTRACT

A fabric production method and a fabric, the production method includes the following steps: (1) selecting an impermeable fabric, an intermediate absorbent layer and a polyester brocade microfiber fabric; (2) sequentially performing alkali fiber-splitting treatment and degreasing treatment on the polyester brocade microfiber fabric; (3) cleaning the treated polyester brocade microfiber fabric; (4) arranging the cleaned polyester brocade microfiber fabric as a surface material and the impermeable fabric as a base material, disposing the intermediate absorbent layer therebetween, and employing an ultrasonic laminating machine to laminate the three layers of materials into one; (5) slitting and crosscutting; (6) folding two ends of a strip of the composite material along a length direction thereof, and arranging a buckle, thus obtaining a semi-finished product; and (7) cleaning the obtained semi-finished product. The fabric has features such as powerful cleaning ability and good adsorption.

10 Claims, 1 Drawing Sheet

(51) Int. Cl.
*B08B 1/00* (2006.01)
*B32B 5/02* (2006.01)
*B32B 5/06* (2006.01)
*B32B 5/08* (2006.01)
*B32B 5/26* (2006.01)
*B32B 7/08* (2019.01)
*B32B 27/12* (2006.01)
*B32B 37/02* (2006.01)
*B32B 37/06* (2006.01)
*B32B 38/00* (2006.01)
*B32B 38/04* (2006.01)
*B32B 38/16* (2006.01)
*B32B 33/00* (2006.01)
*B32B 37/10* (2006.01)
*B32B 27/36* (2006.01)
*B32B 27/34* (2006.01)
*B32B 23/10* (2006.01)

(52) U.S. Cl.
CPC ............ *B32B 5/08* (2013.01); *B32B 5/26* (2013.01); *B32B 7/08* (2013.01); *B32B 23/10* (2013.01); *B32B 27/12* (2013.01); *B32B 27/34* (2013.01); *B32B 27/36* (2013.01); *B32B 33/00* (2013.01); *B32B 37/02* (2013.01); *B32B 37/06* (2013.01); *B32B 37/10* (2013.01); *B32B 38/00* (2013.01); *B32B 38/0004* (2013.01); *B32B 38/04* (2013.01); *B32B 38/162* (2013.01); B32B 2038/045 (2013.01); *B32B 2250/20* (2013.01); *B32B 2255/02* (2013.01); *B32B 2262/0261* (2013.01); *B32B 2262/0276* (2013.01); *B32B 2262/0284* (2013.01); *B32B 2262/062* (2013.01); *B32B 2307/7145* (2013.01); *B32B 2307/726* (2013.01); *B32B 2307/728* (2013.01); *B32B 2307/7246* (2013.01); *B32B 2307/7265* (2013.01); *B32B 2307/732* (2013.01); *B32B 2432/00* (2013.01)

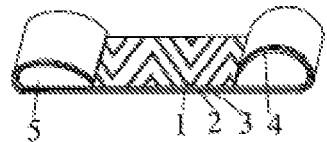

FABRIC PRODUCTION METHOD AND THE FABRIC

CROSS-REFERENCE TO RELATED APPLICATIONS

This application is a continuation of International Application No. PCT/CN2017/103967, filed on Sep. 28, 2017, which claims priority from Chinese Patent Application No. 201610957122.9, filed on Nov. 3, 2016, both of which are hereby incorporated by reference in their entireties.

TECHNICAL FIELD

The present invention relates to mop fabric technical field, in particular, to a fabric production method and the fabric.

BACKGROUND

The laboratories in certain special fields, such as the aseptic room for the production of drugs, the study of biological cells, etc., have a high requirement for cleanliness, which need to achieve ten thousand levels of cleanliness. Mop fabric or rag fabric commonly used on the market does not meet the requirements, the main reason is that the fabric of the mop can not effectively adsorb dust and kill bacteria. Even if bacteria can be killed by bactericide, the killed bacteria can not be taken away by the mop.

SUMMARY

In order to overcome the shortcomings of the prior art, the invention provides fabric production method. The fabric produced by the method can kill bacteria, adsorb bacteria, dust, particles and moisture etc., and it has strong adsorption ability. A piece of fabric with a length of 4-80 cm and a width of 3-35 cm can clean an area of 8 square meters, which has a strong cleaning capacity and good adsorption.

The technical scheme are as follows: fabric production method includes the following steps:

(1) selecting an impermeable fabric, an intermediate adsorbent layer and a polyester brocade microfiber fabric, and its specification of the polyester-nylon superfine fiber fabric is 50D/36F-400D/144F;

(2) sequentially performing alkali fiber-splitting treatment and degreasing treatment on the polyester brocade microfiber fabric. Before fiber opening, the fineness of ultra-fine fiber in the polyester brocade microfiber fabric is not much different from that of ordinary fiber. When the fiber is opened by alkali fiber-splitting treatment, some polyester fiber is dissolved in strong alkali and high temperature condition, the polyester and the nylon fiber are cracked and peeled off, and the fiber is refined. The gap at the intersection point of the fabric is increased, so as to increase moisture absorption and sweat adsorption of the polyester.

(3) cleaning said polyester brocade microfiber fabric treated in step (2) using pure water;

(4) arranging the polyester brocade microfiber fabric cleaned in step (3) as a surface material and the impermeable fabric as a base material, disposing the intermediate absorbent layer therebetween, and employing an ultrasonic laminating machine to laminate the three layers of materials into one, thus obtaining a composite material; and the surface of the composite material is formed a pattern. Preferably, each time the composite process, the fabric with the length of 50-100 meters is formed, the pattern is V-shaped, and the V-shaped pattern is favorable for dragging the fabric in the using process;

(5) slitting and crosscutting during said step (4), the composite material is slit and crosscut by the ultrasonic laminating machine, thus obtaining composite strips;

(6) folding two ends of each of the composite strip along its length direction thereof, and arranging a buckle, the means of arranging the buckle being laminating by means of an ultrasonic laminating machine or sewing, thus obtaining a semi-finished product;

(7) cleaning the obtained semi-finished product with pure water.

The above method also includes the process of drying and sterilizing the composite material.

In the step (3), bactericide is added into the pure water to prevent cross contamination while sterilizing.

The impermeable fabric is produced by coating the impermeable agent on the ordinary fabric. Or the impermeable fabric is a plastic that can prevent bacteria and moisture from passing through, or an kind of isolation paper, preferably, or the isolation paper disclosed in the Chinese patent ZL201310150288.4.

The intermediate adsorbent layer is a sponge or adsorbed non-woven fabric, and the adsorbed non-woven fabric contains 50%-90% by weight of adhesive and 10%-50% by weight of polyester.

The cleaning method in step (3) and step (7) is described in the Chinese patent ZL201310344005.1.

In the step (4), the polyester brocade microfiber fabric, the intermediate adsorbent layer and the impermeable fabric are wound on a roller respectively. The three rollers rotate in the same direction at the same time and transport the polyester brocade microfiber fabric, the intermediate adsorbent layer and the impermeable fabric to the same processing position, so that the polyester brocade microfiber fabric, the intermediate adsorption layer and the impermeable fabric are overlapped 50-100 meters in sequence, then the three layer materials are combined by the ultrasonic composite machine. Compared with the existing artificial needle and thread composite technology, during the time for producing one piece of the fabric, the roller and the ultrasonic composite machine can produce 18-20 pieces, it greatly reduces the cost and improves the working efficiency.

Preferably, the polyester brocade microfiber fabric contains 50%~90% by weight of polyester and 10%~50% by weight of nylon. More preferably, the polyester brocade microfiber fabric contains 70% by weight of polyester and 30% by weight of nylon.

The ultrasonic composite machine forms lines on the surface of the composite material.

Fabric produced by the above methods includes composite strips with a surface layer, an intermediate adsorbent layer and the impermeable bottom layer, the surface layer is a polyester brocade microfiber fabric; two opposite ends of the impermeable bottom layer is provided with a buckle respectively, the buckle is formed by folding its opposite ends of the composite strip along its length direction and its sides of said folding part are sutured on the impermeable bottom layer to forms an opening.

The fabric is 4-80 cm long and 3-35 cm wide.

The fabric is provided with a pattern; the pattern is straight, transverse, prism or V-shaped.

In the fabric, the polyester brocade microfiber fabric has good adsorption and killing bacteria, fine dust performance and strong cleaning ability by alkaline process and removing oil process. The intermediate adsorption layer can adsorb and store water, dust and bacteria. The impermeable bottom layer can prevent the bacteria, dust, moisture and so on from permeating and polluting the mop on the polyester brocade microfiber fabric and the intermediate adsorption layer, thereby avoiding further contamination of the new fabric by the contaminated mop after the fabric is replaced.

The beneficial effects in the present invention are as follows: The fabric produced by the method is applied to clean the aseptic room, which can kill bacteria, adsorb bacteria, micro-dust, particles, water and the like, and the fabric with the length of 50-80 cm and the width of 15-25 cm can clean the area of 8-10 square meters, it has strong cleaning ability and good adsorption.

BRIEF DESCRIPTION OF THE DRAWINGS

FIG. 1 is a schematic diagram of the structure of the fabric described in the present invention.

DETAILED DESCRIPTION OF EMBODIMENTS

In order to make the invention purpose, the technical scheme and the technical effect are more clear, and the invention is further explained in combination with the concrete embodiment below. It should be understood that the specific embodiments described herein and related drawings are used only for the interpretation of the present invention and not for limiting the invention.

Embodiment 1 a fabric production method includes the following steps:
(1) selecting an impermeable fabric, an intermediate adsorbent layer and a polyester brocade microfiber fabric, the polyester content in the polyester brocade microfiber fabric is 70% by weight, the nylon content is 30% by weight, and the specification of the polyester brocade microfiber fabric is 75D/36F;
(2) sequentially performing alkali fiber-splitting treatment and degreasing treatment on the polyester brocade microfiber fabric;
(3) cleaning said polyester brocade microfiber fabric treated in step (2) using pure water;
(4) arranging the polyester brocade microfiber fabric cleaned in step (3) as a surface material and the impermeable fabric as a base material, disposing the intermediate absorbent layer therebetween, and employing an ultrasonic laminating machine to laminate the three layers of materials into one, thus obtaining a composite material with the length of 80 meters; and the surface of the composite material is formed a V-shaped pattern;
(5) slitting and crosscutting during said step (4), the composite material is slit and crosscut by the ultrasonic laminating machine, thus obtaining composite strips with the 25 cm width and 50 cm length;
(6) folding two ends of each of the composite strip along its length direction thereof, and arranging a buckle, the means of arranging the buckle being laminating by means of an ultrasonic laminating machine or sewing, thus obtaining a semi-finished product;
(7) the obtained semi-finished product with pure water;
(8) the semi-finished product produced in step (7) is dried and sterilized by gamma.

The impermeable fabric is coated with an impermeable agent on an ordinary fabric.

The intermediate adsorbent layer is a sponge or adsorbed non-woven fabric, and the adsorbed non-woven fabric contains 70% by weight of adhesive and 30% by weight of polyester.

The composite process in the above step (4) is that the polyester brocade microfiber fabric, the intermediate adsorption layer and the impermeable fabric are wound on a roller respectively. The three rollers rotate in the same direction at the same time and transport to the same processing position, so that the polyester brocade microfiber fabric, the intermediate adsorbent layer and the impermeable fabric are overlapped 50 meters in sequence, then the three layer materials are combined by the ultrasonic composite machine.

Embodiment 2

Fabric production method comprises the following steps:
(1) selecting an impermeable fabric, an intermediate adsorption layer and a polyester brocade microfiber fabric, the polyester content in the polyester brocade microfiber fabric is 50% by weight, the nylon content is 50% by weight, and the specification of the polyester brocade microfiber fabric is 105D/72F;
(2) sequentially performing alkali fiber-splitting treatment and degreasing treatment on the polyester brocade microfiber fabric;
(3) cleaning said polyester brocade microfiber fabric treated in step (2) using 18.2 trillion of pure water; the pure water is added with bactericide;
(4) arranging the polyester brocade microfiber fabric cleaned in step (3) as a surface material and the impermeable fabric as a base material, disposing the intermediate absorbent layer therebetween, and employing an ultrasonic laminating machine to laminate the three layers of materials into one, thus obtaining a composite material with the length of 50 meters; and the surface of the composite material is formed a prism pattern;
(5) slitting and crosscutting during said step (4), the composite material is slit and crosscut by the ultrasonic laminating machine, thus obtaining composite strips with the 35 cm width and 30 cm length;
(6) folding two ends of each of the composite strip along its length direction thereof, and arranging a buckle, the means of arranging the buckle being laminating by means of an ultrasonic laminating machine or sewing, thus obtaining a semi-finished product;
(7) the obtained semi-finished product with pure water.

The impermeable fabric isolation paper.

The intermediate adsorbent layer is adsorbed non-woven fabric, and the adsorbed non-woven fabric contains 90% by weight of adhesive and 10% by weight of polyester.

Embodiment 3 fabric production method comprises the following steps:
(1) preparing materials selecting an impermeable fabric, an intermediate adsorption layer and a polyester brocade microfiber fabric, the content of the polyester in the polyester brocade microfiber fabric is 90% by weight, the content of the nylon is 10% by weight, and the specification of the polyester brocade microfiber fabric is 400D/144F;
(2) sequentially performing alkali fiber-splitting treatment and degreasing treatment on the polyester brocade microfiber fabric;
(3) cleaning said polyester brocade microfiber fabric treated in step (2) using 18.2 trillion of pure water;

(4) arranging the polyester brocade microfiber fabric cleaned in step (3) as a surface material and the impermeable fabric as a base material, disposing the intermediate absorbent layer therebetween, and employing an ultrasonic laminating machine to laminate the three layers of materials into one, thus obtaining a composite material with the length of 100 meters; and the surface of the composite material is formed a transverse pattern;

(5) slitting and crosscutting during said step (4), the composite material is slit and crosscut by the ultrasonic laminating machine, thus obtaining composite strips with the 3 cm width and 4 cm length;

(6) folding two ends of each of the composite strip along its length direction thereof, and arranging a buckle, the means of arranging the buckle being laminating by means of an ultrasonic laminating machine or sewing, thus obtaining a semi-finished product;

(7) cleaning the obtained semi-finished product with pure water, the washed method was disclosed in Chinese Patent ZL201310344005.1.

The impermeable fabric is the isolation paper disclosed in Chinese Patent ZL201310150288.4

The intermediate adsorbent layer is adsorbed non-woven fabric, and the adsorbed non-woven fabric contains 50% by weight of adhesive and 50% by weight of polyester.

Embodiment 4

Referring to FIG. 1, the fabric produced by the above method includes composite strips with a surface layer 1, an intermediate adsorbent layer 2 and the impermeable bottom layer 3, the surface layer 1 is a polyester brocade microfiber fabric. Two opposite ends 4 of the impermeable bottom layer 3 are symmetrically provided with a buckle 5 respectively. The buckle 5 and a mop rod are mutually matched, which are convenient to be sleeved on the mop rod or fall off from the mop rod.

The buckle 5 is formed by folding its opposite ends of the composite strip along its length direction, the buckle and its sides of the folding part are sutured on the impermeable bottom layer to forms an opening, The fabric is 4-80 cm long and 3-35 cm wide.

The fabric is provided with a pattern 8 the pattern is straight, transverse, prism or V-shaped.

The above content is a further detailed description of the invention in combination with a specific preferred embodiment, and it can not be concluded that the specific implementation of the invention is limited to these instructions. For the general technical personnel in the technical field to which the invention belongs, without being separated from the conception of the invention, the architecture form can be flexible and changeable, and a series of products can be derived. Just making a number of simple deductions or substitutes should be regarded as falling within the scope of patent protection determined by the claim submitted by the present invention.

What is claimed is:

1. Fabric production method, wherein comprising the following steps:
   (1) selecting an impermeable fabric, an intermediate adsorbent layer and a polyester brocade microfiber fabric, wherein the specification of said polyester brocade microfiber fabric is 50D/36F-400D/144F;
   (2) sequentially performing alkali fiber-splitting treatment and degreasing treatment on said polyester brocade microfiber fabric;
   (3) cleaning said polyester brocade microfiber fabric treated in step (2) using pure water;
   (4) arranging said polyester brocade microfiber fabric cleaned in step (3) as a surface material and said impermeable fabric as a base material, disposing said intermediate absorbent layer therebetween, and employing an ultrasonic laminating machine to laminate the three layers of materials into one, thus obtaining a composite material;
   (5) slitting and crosscutting during said step (4), said composite material is slit and crosscut by said ultrasonic laminating machine, thus obtaining composite strips;
   (6) folding two ends of each of said composite strip along its length direction thereof, and arranging a buckle, the means of arranging the buckle being laminating by means of an ultrasonic laminating machine or sewing, thus obtaining a semi-finished product;
   (7) cleaning the obtained semi-finished product with pure water.

2. The fabric production method according to claim 1, wherein in said step (4), said polyester brocade microfiber fabric, said intermediate adsorbent layer and said impermeable fabric are wound on a roller respectively; three of said rollers rotate in the same direction at the same time, so that said polyester brocade microfiber fabric, said intermediate adsorbent layer and said impermeable fabric are overlapped in sequence, then combined by said ultrasonic composite machine.

3. The fabric production method according to claim 1, wherein in said step (3), bactericide is added into said pure water.

4. The fabric production method according to claim 1, wherein said impermeable fabric is produced by coating the impermeable agent on a fabric, or a plastic or an isolation paper.

5. The fabric production method according to claim 1, wherein said intermediate adsorbent layer is a sponge or adsorbed non-woven fabric, and said adsorbed non-woven fabric contains 50%-90% by weight of adhesive and 10%-50% by weight of polyester.

6. The fabric production method according to claim 1, wherein said polyester brocade microfiber fabric contains 50%-90% by weight of polyester and 10%-50% by weight of nylon.

7. The fabric production method according to claim 1, wherein said ultrasonic composite machine forms lines on its surface of said composite material.

8. Fabric produced according to claim 1, wherein, comprising composite strips with a surface layer, an intermediate adsorbent layer and an impermeable bottom layer, said surface layer is a polyester brocade microfiber fabric; two opposite ends of said impermeable bottom layer is provided with a buckle respectively, said buckle is formed by folding its opposite ends of said composite strips along its length direction and its sides of said folding part are sutured on said impermeable bottom layer to forms an opening.

9. The fabric according to claim 8, wherein said fabric is 4-80 cm long and 3-35 cm wide.

10. The fabric according to claim 8, wherein said fabric is provided with a pattern; said pattern is straight, transverse, prism or V-shaped.

* * * * *